US007107933B2

(12) United States Patent
Mohr

(10) Patent No.: US 7,107,933 B2
(45) Date of Patent: Sep. 19, 2006

(54) LITTER-FREE PET WASTE COLLECTION SYSTEM

(76) Inventor: Catherine C. Mohr, 1920 E. 45th St. North, Wichita, KS (US) 67219

( * ) Notice: Subject to any disclaimer, the term of this patent is extended or adjusted under 35 U.S.C. 154(b) by 0 days.

(21) Appl. No.: 10/922,183

(22) Filed: Aug. 19, 2004

(65) Prior Publication Data

US 2006/0037548 A1    Feb. 23, 2006

(51) Int. Cl.
*A01K 29/00* (2006.01)

(52) U.S. Cl. .................................................. 119/166
(58) Field of Classification Search ................ 119/161, 119/165, 166, 169, 479
See application file for complete search history.

(56) References Cited

U.S. PATENT DOCUMENTS

| | | |
|---|---|---|
| 3,752,121 A | 8/1973 | Brazzell |
| 3,890,931 A | 6/1975 | Saver |
| 4,271,544 A * | 6/1981 | Hammond ..................... 4/661 |
| 4,326,481 A | 4/1982 | Gruss |
| 4,649,578 A | 3/1987 | Vargo |
| 5,184,574 A | 2/1993 | Kirk et al. |
| 5,353,743 A | 10/1994 | Walton |
| 5,367,984 A | 11/1994 | Purnell |
| 5,394,835 A * | 3/1995 | Gatta ........................ 119/170 |
| 5,454,349 A * | 10/1995 | Bondurant, III ............ 119/166 |
| 5,482,007 A | 1/1996 | Kumlin |
| 5,630,377 A | 5/1997 | Kumlin |
| 6,408,790 B1 | 6/2002 | Maquire |
| 6,487,989 B1 | 12/2002 | Yamamoto |
| 6,523,495 B1 | 2/2003 | Rydman |
| 6,615,765 B1 | 9/2003 | Thomas |

OTHER PUBLICATIONS

The Problem With Cats, Case Study Ch. 18, p. 282a, Planning and Growing a Business Venture, 2002 Kauffman Center for Entrepreneurial Leadership at the Ewing Marion Kauffman Foundation.

* cited by examiner

*Primary Examiner*—Son T. Nguyen
(74) *Attorney, Agent, or Firm*—Stinson Morrison Hecker LLP

(57) ABSTRACT

A litter-free pet waste collection system providing a sanitary, easy to clean and aesthetically pleasing unit for receiving household pet waste without utilizing granular or pelleted litter, comprising a base, a diverting tray having a sloped bottom surface and an aperture therein for draining liquid waste, a perimeter wall section for containing waste, a support tray and grill lined with a permeable, non-absorbent material for supporting the animal in the unit while allowing liquid waste to flow through to the diverting tray, and a removable covered liquid waste receptacle housed in the base and aligned under the diverting tray aperture whereby liquid waste is easily disposed of and odor is effectively contained.

15 Claims, 3 Drawing Sheets

LITTER-FREE PET WASTE COLLECTION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is generally directed to a waste collection system for pets, and more specifically, to a waste collection system that controls odor and spillage of pet waste, provides for easy disposal of pet waste and does not require granular litter or pellets.

2. Description of Related Art

Conventional litter boxes for use with felines and other small indoor pets can be extremely messy and malodorous. Conventional litter boxes utilize granular litter or pellets that are easily scattered throughout the house by the pet. The litter is tracked from the box by the pet as a result of moisture or static electricity when the pet uses the conventional litter box. The litter may also be kicked out of the conventional litter box scattering litter around the area immediately surrounding the conventional litter box as a result of the animal's instinctive tendency to scratch or dig in the area used for elimination. This litter may then be tracked throughout the house.

Conventional litter boxes are also cumbersome to empty and clean. The solid waste must be cleaned out of the granular litter or pellets and the entire volume of litter or pellets must routinely be emptied and replaced in the litter box. The design of conventional litter boxes requires that the soiled litter and waste be scooped from the box, or that the entire box be lifted and either dumped into a trash bag or carried to a disposal bin or toilet. This requirement can result in spillage of waste and/or litter throughout the house. Additionally, even odor-controlling litter does not always effectively control pet waste odors, particularly those resulting from liquid waste which remains in the conventional litter box until such time as there is enough solid waste to justify replacing the entire volume of granular litter or pellets contained in the litter box. Accordingly, pet owners are constantly looking for a better way to contain pet waste and odor as well as a better way to dispose of the pet waste and maintain a sanitary "litter" box. Particularly in recent years, a need has arisen for a pet litter box system having the above-mentioned attributes that will accommodate not only felines, but also canines, rabbits, ferrets, or other indoor pets.

BRIEF SUMMARY OF THE INVENTION

The present invention is directed to a litter-free pet waste collection system that effectively reduces the odor and mess associated with conventional pet litter boxes. The waste collection system includes a base supporting a diverting tray, a support frame positioned above the diverting tray and an optional perimeter wall section surrounding the support tray, wherein the base also houses an easily removable covered liquid waste receptacle below the diverting tray. The diverting tray directs liquid waste through an aperture and into the removable covered liquid waste receptacle. The support frame includes a grill or perforated surface which allows liquid waste to pass through to the diverting tray underneath, yet retains solid waste on its surface for easy removal and disposal. The waste collection system of the present invention does not utilize granular litter or other pelleted products. The unit is preferably utilized with a length of artificial turf or other permeable, non-absorbent material, although the unit could be utilized without any such additional material. The unit may include a perimeter wall section surrounding the perimeter of the unit, which extends upward a distance to further contain the animal waste and odor. The waste collection system may also include a set of steps to allow the pet to easily enter and exit the unit, as well as a cover for the top of the unit.

In a first embodiment, the waste collection system includes a base that supports a diverting tray. The diverting tray is removably secured to the top of the base so that it remains securely in place. The bottom of the diverting tray is angled so that liquid waste will drain to one area of the tray. An aperture is located in the bottom of the diverting tray, at the lowest point, so that all of the liquid waste will drain through the aperture. The base forms a cavity that houses a removable liquid waste receptacle. The receptacle has a lid containing an aperture that is aligned directly underneath the diverting tray aperture to allow for collection of the liquid waste. The receptacle is individually removable from the entire system, thus eliminating the need to carry the entire system to a trash can or toilet for waste removal. The liquid waste contained in the receptacle may be easily and conveniently transported to a toilet or other location for emptying.

An optional perimeter wall section may be securely nested within the perimeter created by the diverting tray to provide additional containment for animal waste and odor, as well as to provide privacy for the pet and pleasing aesthetics for the pet owner. The perimeter wall section comprises three continuous side walls and a fourth side wall having an entryway cut out to enable an animal to pass through the doorway created thereby so as to enter and exit the waste collection system. If a perimeter wall section is used, a support frame is sized to fit within the frame of the perimeter wall section. If there is no perimeter wall section, the support frame nests directly within the perimeter of the diverting tray. The support frame operates to support the animal using the system. The support frame includes a grill having a grated or perforated bottom surface such that liquids may pass through the grill but animals will be adequately supported thereon. A sheet of permeable, non-absorbent material may be placed upon the top surface of the grill to provide a surface onto which an animal may relieve itself. Solid waste will be retained on top of the material and liquid waste will pass freely through the material and grill into the diverting tray and down into the receptacle. All of the pieces are separate and are independently removable from the system for ease of cleaning and manufacture.

In a preferred embodiment, the base includes interchangeable drawers located within the base cavity. One drawer houses the removable liquid waste receptacle so that it may be easily removed from the base for ease of disposal and cleaning. A second drawer is provided for storage.

In another embodiment, the system includes re-positionable steps to allow access to the system by the pet. The steps may be secured to the base in a variety of directions to accommodate various household floorplans.

In an alternative embodiment, the unit is integrally molded such that the base and diverting tray form a single piece. The steps may also be integrally molded thereto.

DETAILED DESCRIPTION OF PREFERRED EMBODIMENT

Figure 1:
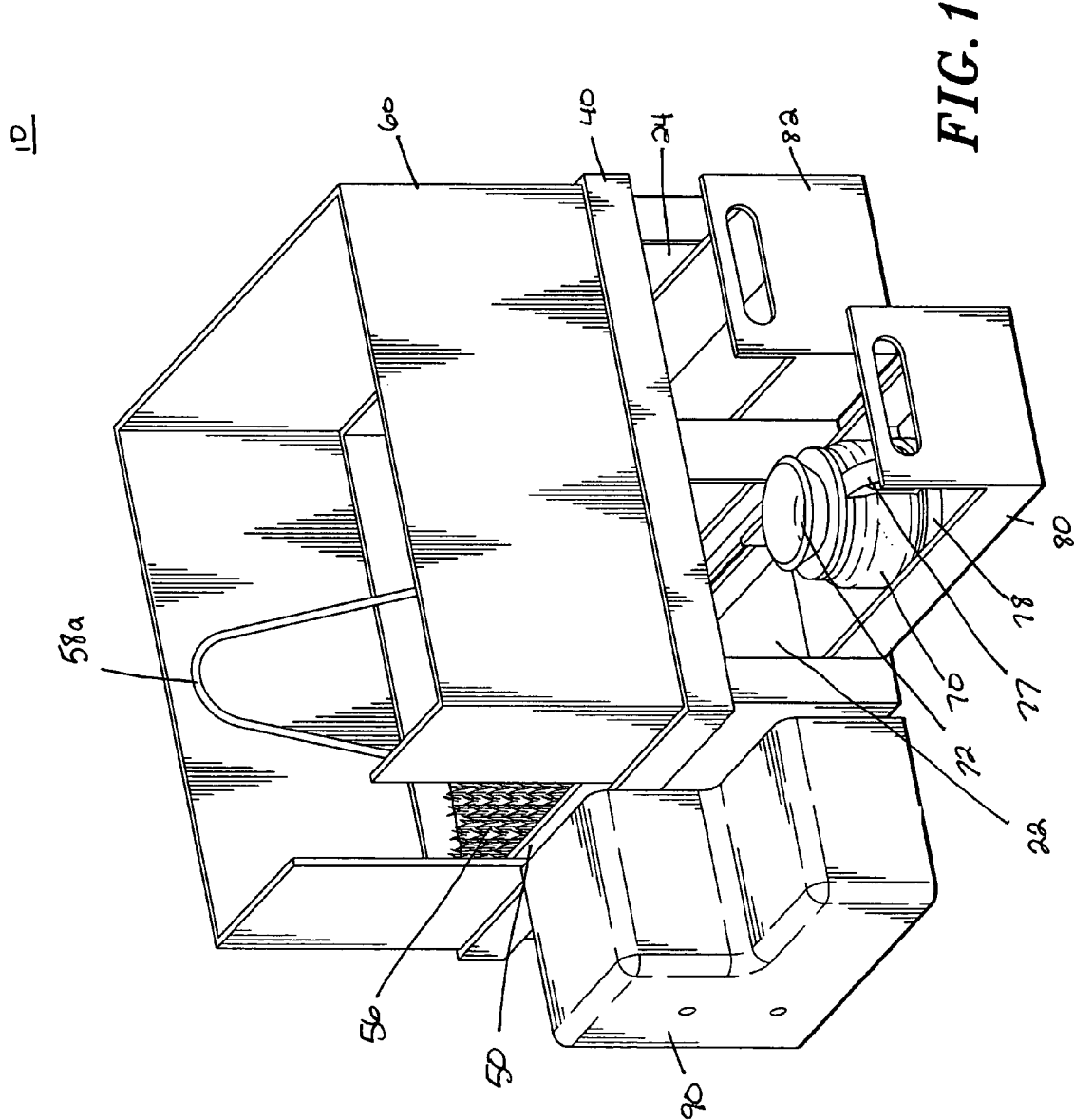
FIG. 1 is a front perspective view of a litter-free pet waste collection system in accordance with one embodiment of the present invention, depicting optional stairs and drawers.
Figure 2:
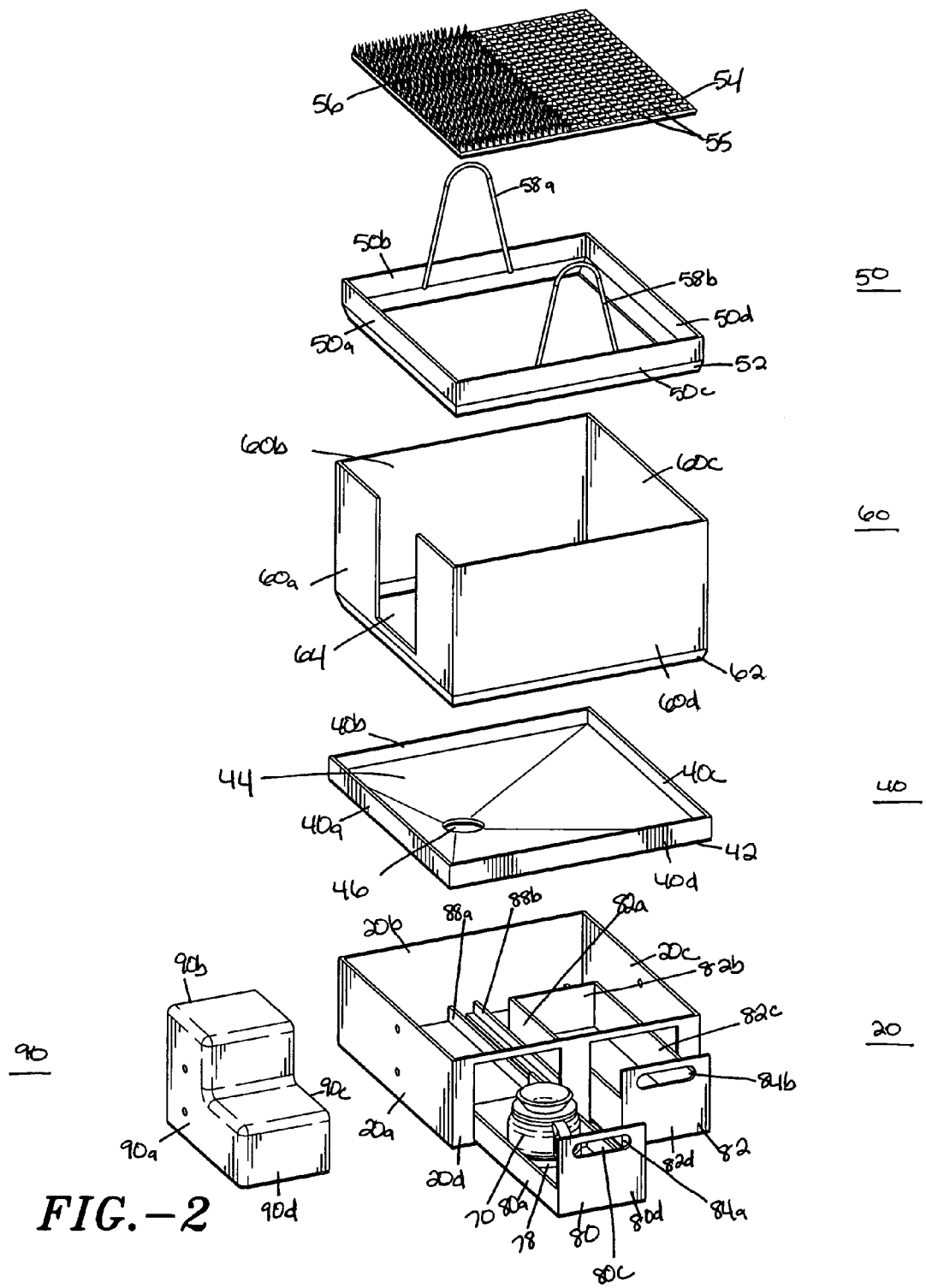
FIG. 2 is an exploded perspective view of the litter-free pet waste collection system of FIG. 1.

Referring first to FIGS. 1 and 2, there is shown a first embodiment of a litter-free pet waste collection system 10 comprising a base 20 that defines an open cavity 30. Base 20 is preferably rectangular in shape such that base 20 comprises four side walls 20a, 20b, 20c, 20d and bottom 20e, forming a perimeter about cavity 30 while leaving the top of base 20 open. While a rectangular shape is preferable for ease and economy of manufacture, base 20 may comprise other perimeter shapes including but not limited to oval or hexagonal, as well as a somewhat triangular shape designed to fit within a corner area. For ease and economy of manufacture, the corners and edges of base 20 are preferably square. Rounded corners and edges (not shown) may be preferred in terms of safety and aesthetics and are also within the scope of this invention. As depicted, base 20 includes openings 22, 24 in side wall 20d to provide easy access to cavity 30 without requiring system 10 to be disassembled. Openings 22, 24 are preferably square in shape but other shapes are well within the scope of the invention. Openings 22, 24 are sized to comfortably accommodate an average sized human hand and receptacle 70 to allow for easy removal of receptacle 70 from cavity 30.

Base 20 also preferably includes at least one aperture in side walls 20a, 20c for receiving nut and bolt assemblies 92 or other securing means to secure steps 90 (discussed in detail below) to base 20. Base 20 is sized to comfortably accommodate an average sized feline or small canine. Accordingly, base 20 is preferably approximately 6 to 10 inches in height, approximately 18 to 26 inches in width, and approximately 15 to 21 inches in depth from 20b to 20d. Base 20 is more preferably approximately 8 inches in height, approximately 22 inches in width, and approximately 18 inches in depth. It should be understood, however, that specific dimensions given herein are not limiting and are only provided as exemplars. A litter-free pet waste collection system of the present invention may be made in virtually any dimension necessary to accommodate a household or other pet. For ease of manufacture, base 20 is preferably molded of a light-weight, non-absorbent and sturdy material, such as plastic. Base 20, however, may also be made of other non-absorbent yet sturdy materials.

Diverting tray 40 is positioned atop open top of base 20 to cover the cavity 30. Bottom surface 44 of diverting tray 40 contains at least one aperture 46 therein and is sloped inward and downward toward aperture 46. Diverting tray 40 is sized to fit over and extend horizontally past the perimeter created by base side walls 20a, 20b, 20c, 20d. While diverting tray 40 shape is preferably complimentary to the shape of base 20, such conformity of shape is not necessary provided diverting tray 40 remains securely in place atop base 20. Diverting tray 40 preferably comprises vertical sides 40a, 40b, 40c, 40d. Sides 40a, 40b, 40c, 40d extend a very short distance vertically upward to contain liquid waste within diverting tray 40 and provide stability to support frame 50 and/or perimeter wall section 60. Diverting tray 40 preferably further comprises angled lower edge 42 that extends inwardly and downwardly from diverting tray sides 40a, 40b, 40c, 40d and is capable of supporting support frame 50 and/or perimeter wall section 60 and assisting in drainage. Bottom of angled perimeter edge 42 continues to slope inward and downward to form diverting tray bottom surface 44. Lowest point of bottom surface 44 is at a vertical height lower than top edge of base 20 and extends downward into open cavity 30. The slope of bottom surface 44 must be such that liquid waste draining into diverting tray 40 will flow towards aperture 46 and drain therethrough. As shown in FIG. 2, bottom surface 44 preferably comprises at least four distinct sloped sections that converge to form aperture 46. Other acceptable geometries of bottom surface 44 include but are not limited to concave or sloped or slanted bottoms comprising any number of distinct sections, include one continuous section, as long as the bottom surface 44 geometry is such that liquid waste will be adequately directly into and through diverting tray aperture 46. Diverting tray sides 40a, 40b, 40c, 40d extend vertically below top edge of base 20 forming a lip to assist in securing diverting tray 40 onto base 20 and preventing substantial movement. For ease of manufacture, diverting tray 40 is preferably molded of a light-weight, non-absorbent and sturdy material, such as plastic, but may also be made of other non-absorbent yet sturdy materials.

Aperture 46 is located at the lowest point of the slope in diverting tray bottom surface 44 in order to facilitate maximum drainage. Aperture 46 is preferably circular in shape and approximately 1 to 3 inches in diameter, and more preferably approximately 2 inches in diameter. Although the present invention preferably utilizes only one open aperture 46, it is within the scope of the invention to utilize a plurality of smaller apertures, as well as a single aperture covered with mesh, a grid, or other perforations. Aperture 46 can be of any size or shape provided liquid waste can drain therethrough while aperture 46 remains small enough such that liquid waste receptacle 70 can be adequately aligned thereunder and still remain relatively small and easy to handle. Aperture 46 may also have lower lip (not shown) extending downward slightly to direct the liquid waste more efficiently therethrough and into diverting tray 40 beneath. Aperture 46 may be located at any position in bottom surface 44, but is preferably located closer to one side 20a of base 20 to enable use of interchangeable drawers 80, 82 (discussed below). Aperture 46 is also preferably located approximately halfway between sides 20b, 20d to allow receptacle 70 to maximize containment of liquid waste spillage. However, provided receptacle 70 is aligned directly beneath aperture 46, exact placement of aperture 46 is optional.

Optional perimeter wall section 60, depicted in FIG. 2, is preferably positioned atop diverting tray 40 to further retain waste and odor within the system 10, to provide privacy for the pet and to render system 10 more aesthetically pleasing to the pet owner. Perimeter wall section 60 is sized and shaped to fit snugly within the frame created by diverting tray sides 40a, 40b, 40c, 40d. Perimeter wall sides 60a, 60b, 60c, 60d extend vertically upward and are preferably at least half the height of base 20 to prevent pet waste from spilling out onto surrounding area. Utilizing the exemplary dimensions above, the height of perimeter wall sides 60a, 60b, 60c, 60d is preferably at least 4 inches and more preferably at least 5 to 6 inches. The height of perimeter wall sides 60a, 60b, 60c, 60d is preferably less than or equal to 3 times the height of base 20, and more preferably less than or equal to 1½ to 2 times the height of base 20, in order to retain stability of system 10. Opening 64 in perimeter wall side 60a provides the animal access to the open area defined within perimeter walls 60a, 60b, 60c, 60d. Opening 64 is preferably a cutout section of perimeter wall side 60a such that the wall is formed of a solid piece of material for stability. Opening 64 is preferably located in the center of side 60a for ease of use, but could be located off-center to one side. Opening 64 is preferably sized to accommodate an average sized feline or small canine and is preferably approximately 9 to 14 inches in width, and more preferably 11 to 13 inches in width. As depicted, perimeter wall section 60 is preferably rectangular in shape, but may be of any general shape provided it compliments diverting tray 40. Bottom lip 62 of perimeter wall section 60 is slightly angled inward and downward to allow snug fit within diverting tray 40 perimeter and to allow for drainage of liquid waste that may spill onto sides, down into diverting tray 40.

Support frame 50 is sized and shaped to preferably be located within perimeter wall section 60. If no perimeter wall section 60 is utilized, support frame 50 is positioned directly atop diverting tray 40 within the perimeter of tray sides 40a, 40b, 40c, 40d. Support frame 50 is preferably rectangular in shape and comprises four sides 50a, 50b, 50c, 50d. Support frame 50 may be any general shape as long as it compliments the shape of diverting tray 40 and, if utilized, perimeter wall section 60. Support frame sides 50a, 50b, 50c, 50d are relatively short and nest snugly inside perimeter wall sides 60a, 60b, 60c, 60d. Similarly, if no perimeter wall section 60 is utilized, support frame 50 nests inside diverting tray sides 40a, 40b, 40c, 40d. Support frame sides 50a, 50b, 50c, 50d operate to assist in containing waste within perimeter of support frame 50. Support frame bottom edge 52 is slightly angled inward and downward to provide support and to allow drainage of spilled or spattered liquid waste into diverting tray 40. Support frame 50 is preferably molded of plastic, although other non-absorbent sturdy materials are within the scope of this invention.

Support frame 50 preferably includes two handles 58a, 58b located on opposite frame sides 50a, 50c. Handles 58a, 58b are preferably made of wire, although plastic or virtually any other sturdy and non-absorbent material may be used. Handles 58a, 58b are secured to sides of frame 50a, 50b to allow frame 50 to be easily lifted out of diverting tray 40 without soiling hands. Grill 54 sets inside support frame perimeter sides 50a, 50b, 50c, 50d and is supported by bottom edge 52. Grill 54 extends to perimeter sides 50a, 50b, 50c, 50d to allow as much liquid waste as possible to pass through into diverting tray 40. Grill 54 is liquid permeable and is preferably a grate-like structure, although grill 54 can be perforated, a grid, or merely contain a plurality of apertures, provided liquid waste is allowed to freely pass through to diverting tray 40. Grill apertures 55 must be large enough for proper drainage but small enough to provide sufficient support to the animal so that the animal's feet do not pass through grill 54. As system 10 does not require the use of granular or pellet-form pet litter, it is not necessary that individual grill apertures 55 be smaller in size than the individual granules of litter. Grill apertures 55 are preferably at least approximately 0.125 inches in diameter if circular, or at least approximately 0.125 by 0.125 inches in size if non-circular. Grill apertures 55 may also be slot openings located within a washboard-like grill 54, in which case the width of grill apertures 55 is preferably at least approximately 0.125 inches. Grill apertures 55 are more preferably at least approximately 0.250 inches in diameter if circular, at least approximately 0.250 by 0.250 inches in size if non-circular, or at least approximately 0.250 inches in width if slots. Grill 54 is preferably made of plastic, although coated metal or other non-corrosive material would be sufficient. Grill 54 and support frame 50 may be separate pieces, as depicted, or they may be one integral unit (not depicted).

Optional permeable, non-absorbent material 56 is preferably placed atop grill 54 to provide an attractive and enticing surface for pets to utilize for relief purposes and to aid in cleaning of system 10. Material 56 should be permeable so that liquid waste freely passes through. Material 56 should be non-absorbent so that liquid waste is not retained therein. Holes or other permeable means of material 56 must be small enough so that solid waste will not pass through into diverting tray 40. As depicted in FIG. 2, a material such as artificial turf is preferable. Other permeable, non-absorbent materials may be utilized provided the material is easily cleanable or can be disposed and replaced after a certain amount of time. Although it is not depicted, frame 50 and grill 54 may be used alone without any additional material 56 covering grill 54. If grill 54 is utilized without additional material 56, holes must be small enough so solid waste does not pass through into diverting tray 40.

Optional drawers 80, 82 are preferably housed inside base cavity 30. Drawer 80 slides out to allow for easy access to receptacle 70. Tracks 88a, 88b for drawers are preferable for stability purposes, but are not absolutely necessary. Tracks 88a, 88b preferably comprise raised areas of plastic which guide drawers 80, 82 although tracks 88a, 88b could be made of metal or other material. Drawer 80 preferably includes positioner 78 located on the inside of drawer bottom 80e. Positioner 78 is sized and shaped to secure receptacle 70 in fixed position in drawer 80 to ensure correct positioning under diverting tray aperture 46 and preferably comprises a raised lip or edge in the general shape of receptacle 70 bottom. Drawer 80 preferably has short side and back walls 80a, 80b, 80c to contain any spillage, although it is within the scope of this invention for drawer 80 to have only side walls 80a, 80c or no walls at all. Drawer 80 has handle 84a for ease of access. A preferred embodiment may utilize a second drawer 82 with taller sides 82a, 82b, 82c, 82d for storage. Second drawer 82 may also have a handle 84b for ease of use. Drawers 80, 82 are preferably interchangeable.

As discussed above, base 20 contains at least one opening 22, 24 in base side 20d to provide access into cavity 30. While drawer 80 is preferable, no drawer is necessary as receptacle 70 could sit on bottom of base 20e. Similarly, a removable or slidable shelf (not shown) could be used in lieu of drawer 80. Positioner 78 may then be located on bottom of shelf or base 20e (not shown). Although positioner 78 is preferable, system 10 may alternatively utilize a visible indicator (not depicted), such as a sticker or other marking located on the bottom of the opening, shelf, or drawer to indicate the correct position of the receptacle 70 underneath the diverting tray aperture 46 such that liquid waste is not directed into cavity 30 or freely into drawer 80, 82. Similarly, system 10 may not utilize any positioner or visible indicator. If drawer 80, 82 is not utilized, opening 22, 24 may optionally include a removable shield or door (not shown) for covering opening 22, 24 so as to prevent access by animal and to assist in containing odor.

Figure 3:
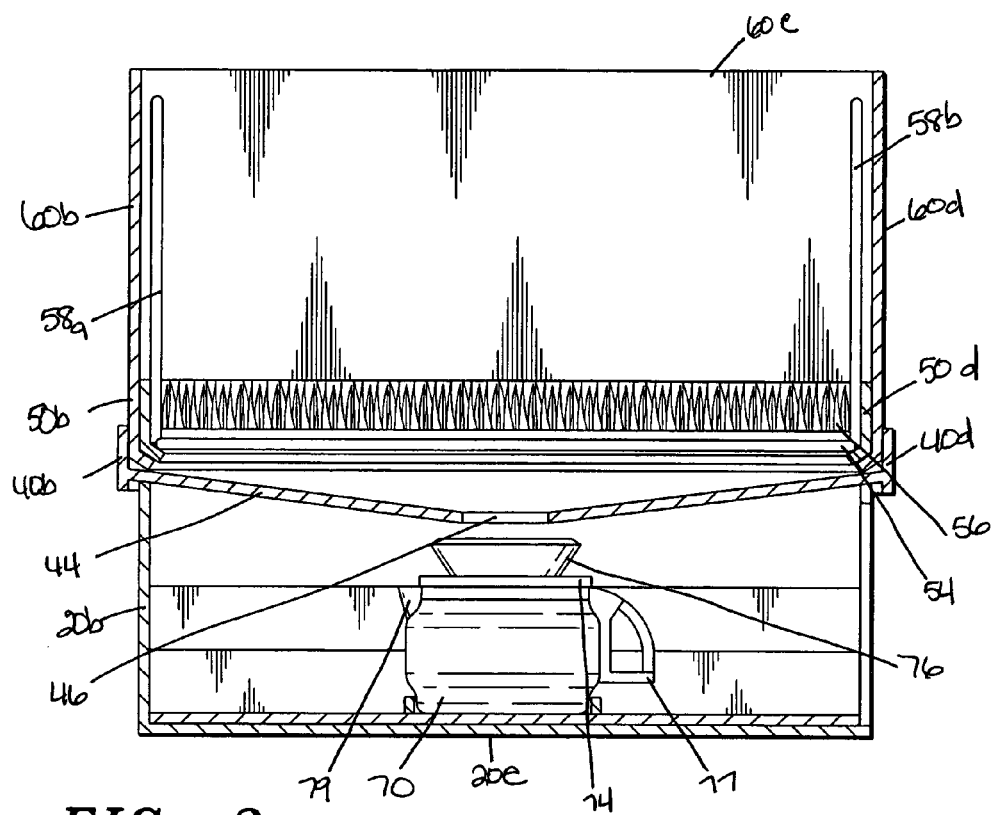
FIG. 3 is a cross sectional away side view of the litter-free pet waste collection system of FIG. 1 taken along line 3—3 of FIG. 1.
Figure 4:
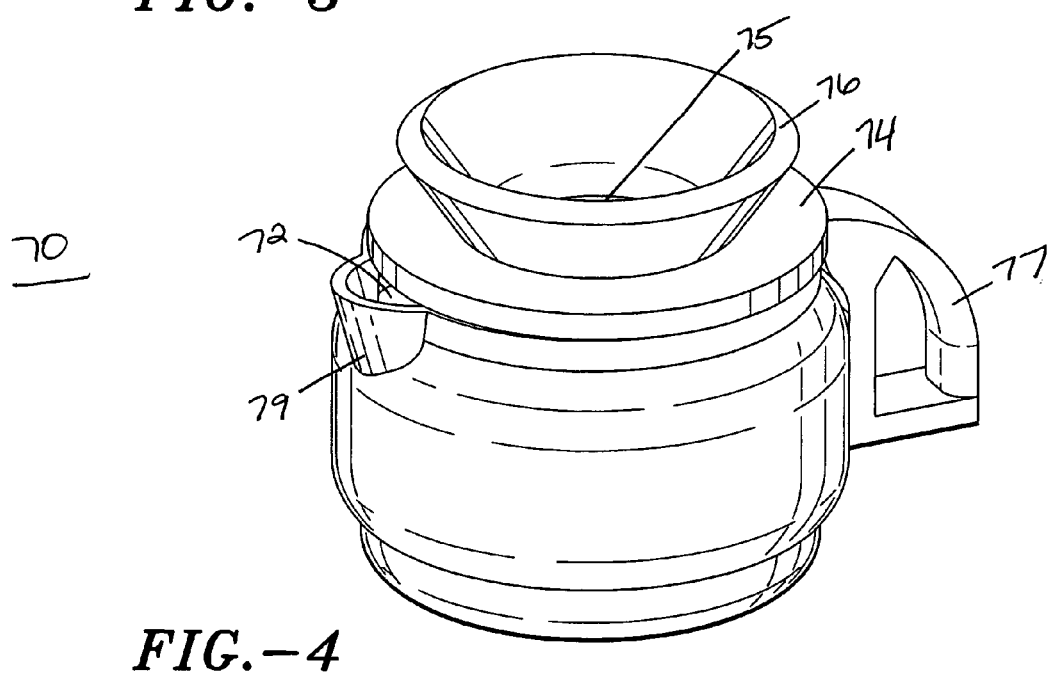
FIG. 4 is a perspective view of the removable liquid waste receptacle of FIG. 1.

Receptacle 70 is housed in base 20 under diverting tray 40 in open cavity 30, and preferably within drawer 80. Opening 72 in top of receptacle 70 is aligned under diverting tray aperture 46. Opening 72 is preferably circular in shape, but could be any shape taking ease of manufacture into account. Similarly, although not necessary, shape of receptacle opening 72 is preferably complimentary to shape of diverting tray aperture 46 to minimize spillage of liquid waste. Receptacle 70 is preferably cylindrical, but could be any shape that is commercially available. Receptacle 70 is preferably made of glass for ease of cleaning, however, other non-absorbent materials such as plastic are also within the scope of the invention. Opening 72 in receptacle 70 is preferably larger than diverting tray aperture 46 to minimize spillage of liquid waste. Receptacle 70 comprises a removable lid or cover 74 to reduce spillage and contain odor. Lid 74 is preferably hinged and is as air tight as possible, with the exception of lid aperture 75 providing access to interior of receptacle 70. Lid aperture 75 is preferably complimentary in shape to opening 72 and is smaller in size. As shown in FIGS. 2 and 3, receptacle 70 preferably comprises funnel 76 secured to top of lid 74 for further assisting in minimizing spillage. Funnel 76 may be removably secured to lid 74 and is preferably larger in diameter than diverting tray aperture 46. Funnel 76 may be curved or have angled sides, as long as it directs liquid waste down into receptacle 70. Receptacle 70 preferably further comprises handle 77 and spout 79 for ease of use and to assist in removing receptacle 70 from cavity 30 and emptying receptacle 70 without spillage. Receptacle 70 is preferably translucent to allow visible indication of when to empty.

Steps 90 are preferably secured to either end of base 20 to enable the animal to safely and cleanly enter and exit system 10. Steps 90 are attachable to base 20 from either side of steps 90a, 90b as well as back 90c of steps to allow for various configurations to fit household set-up. Steps 90 are preferably attached to base 20 with nut and bolt assemblies 92 or other removable securing means to allow for removal and repositioning of steps 90. Steps 90 include at least one aperture located in side 90a, 90b, 90c for securing steps 90 to base 20. Steps 90 are sized to raise the animal to a height where it can easily enter and exit the open area within the perimeter of support frame 50. Steps 90 preferably include two steps, although any number and height of steps 90 are appropriate to enable the animal to easily enter and exit system 10. Based on the exemplar dimensions provided herein, the height of steps 90 is preferably 8 to 12 inches and more preferably 10 inches.

System 10 preferably utilizes cover (not shown) to further contain waste and odor within the system 10. Cover is purely optional. Cover is made of nylon or other similar material and is fitted around the top edge of perimeter wall section 60. Plastic ribbing or other similar material is inserted into cover material to provide structure to cover and form a tent or canopy over the open area within perimeter wall section 60. Other means of covering system 10 known in the art may also be utilized.

In another embodiment (not shown), base 20 and diverting tray 40 may be molded as one integral piece. Steps 90 may also be molded integrally with base 20 and diverting tray 40.

In use, the animal enters system 10 from one end of base 20, using optional steps 90. The animal will step through opening 64 of perimeter wall section 60 and onto material 56 resting on grill 54. Perimeter wall section 60 will assist in containing any spray or splatter from the animal. The animal will then relieve itself and may even scratch or dig at the grill 54 or material 56. Alternatively, the animal may step directly onto grill 54 if no permeable material 56 is used. Also in the alternative, if no perimeter wall section 60 is being utilized, the animal will not need to step through opening 64, but may simply step onto grill 54. Any liquid waste drains through the material 56 and/or grill 54 into diverting tray 40 and is directed through aperture 46 in diverting tray bottom surface 44 and into removable covered receptacle 70 via opening 72 located directly below. Liquid waste is then emptied from removable covered receptacle 70 by opening drawer 80 (or alternative door or shield) and removing receptacle 70. If no drawer is utilized, pet owner may simply reach into opening 22 and remove receptacle 70. Receptacle 70 is then easily carried to a toilet or other disposal site and the liquid waste is easily disposed of by removing or lifting lid 74. Receptacle 70 may then be rinsed out and replaced within base cavity 30. Any solid waste is removed from the material 56 or grill 54. The pieces of system 10 may be disassembled and cleaned as often as desired. Material 56 may be replaced periodically as needed.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and sub-combinations. This is contemplated by and is within the scope of the claims.

What is claimed and desired to be secured by Letters Patent is as follows:

1. A litter-free pet waste collection system, comprising:
   a base having an outer perimeter wall and an open cavity within said perimeter wall;
   a diverting tray resting on said outer perimeter wall of the base and positioned over said open cavity, said diverting tray comprising an outer perimeter comprising vertically extending side walls and a bottom surface,
   said vertically extending side walls extending along an exterior of said outer perimeter wall of said base, extending a distance above said bottom surface of the diverting tray, and extending a distance below a top edge of said outer perimeter wall of said base;
   said bottom surface being sloped inwardly and downwardly from said outer perimeter of said diverting tray, and comprising at least one aperture positioned at the lowest point of said bottom surface;
   a support frame positioned above and within the perimeter of said diverting tray, said support frame having a central opening grill sized to fit within the perimeter of said diverting tray and having a perforate surface through which liquid waste is free to pass, said perforate surface positioned at a vertical height above said diverting tray;
   a removable grill resting within a perimeter of said support frame over the central opening of said support frame at a vertical height above said diverting tray, wherein said grill has a perforate surface through which liquid waste is free to pass;
a liquid permeable, non-absorbent material positioned over said removable grill;
a wall frame configured to rest within said diverting tray perimeter and comprising upwardly vertically extending side walls, wherein an access portal is located in at least one of said wall frame side walls and wherein said wall frame is 1.5 to 2.0 times the height of said base;
a removable shelf housed within said open cavity; and
an independently removable liquid waste receptacle having an opening aligned under said at least one diverting tray aperture and supported by said removable shelf.

2. The litter-free waste collection system of claim 1, wherein said permeable, non-absorbent material is artificial turf.

3. The litter-free waste collection system of claim 1, further comprising a housing fitting over said base, said housing creating an upper cavity sized to allow entrance and exit of an animal from said waste collection system.

4. The litter-free waste collection system of claim 1, wherein said removable receptacle further comprises a funnel portion having opposed ends wherein the first and smaller open end is attached to said receptacle opening and the second and larger open end extends upward and is aligned to surround said at least one diverting tray aperture.

5. The litter-free waste collection system of claim 1, further comprising steps, said steps being removably attached to said base, and said steps being repositionable in direction of entrance to allow access to said support grill by an animal.

6. A litter-free pet waste collection system, comprising:
a base having an outer perimeter wall and an open cavity within said perimeter wall;
a diverting tray resting on said outer perimeter wall of the base and positioned over said open cavity, said diverting tray comprising an outer perimeter comprising vertically extending side walls and a bottom surface, said vertically extending side walls extending along an exterior of said outer perimeter wall of said base, extending a distance above said bottom surface of the diverting tray, and extending a distance below a top edge of said outer perimeter wall of said base;
said bottom surface being sloped inwardly and downwardly from said outer perimeter of said diverting tray, and comprising at least one aperture positioned at the lowest point of said bottom surface;
a support frame positioned above and within the perimeter of said diverting tray, said support frame having a central opening grill sized to fit within the perimeter of said diverting tray and having a perforate surface through which liquid waste is free to pass, said perforate surface positioned at a vertical height above said diverting tray;
a removable grill resting within a perimeter of said support frame over the central opening of said support frame at a vertical height above said diverting tray, wherein said grill has a perforate surface through which liquid waste is free to pass;
a wall frame configured to rest within said diverting tray perimeter and comprising upwardly vertically extending side walls, wherein an access portal is located in at least one of said wall frame side walls and wherein said wall frame is 1.5 to 2.0 times the height of said base;
a removable shelf housed within said open cavity; and
an independently removable liquid waste receptacle having an opening aligned under said at least one diverting tray aperture and supported by said removable shelf.

7. The litter-free pet waste collection system of claim 6, further comprising a first drawer housed in said open cavity, said first drawer being located adjacent said removable shelf, and said first drawer and said removable shelf being interchangeable in position within said open cavity.

8. The litter-free waste collection system of claim 6, further comprising a liquid permeable, non-absorbent material positioned over said removable grill.

9. The litter-free waste collection system of claim 8, wherein said permeable, non-absorbent material is artificial turf.

10. The litter-free waste collection system of claim 6, wherein said receptacle further comprises an integrated cover.

11. The litter-free waste collection system of claim 6, further comprising a housing fitting over said base, said housing creating an upper cavity sized to allow entrance and exit of an animal from said waste collection system.

12. The litter-free waste collection system of claim 6, wherein said removable receptacle further comprises a funnel portion having opposed ends wherein the first and smaller open end is attached to said receptacle opening and the second and larger open end extends upward and is aligned to surround said at least one diverting tray aperture.

13. The litter-free waste collection system of claim 6, further comprising steps, said steps being removably attached to said base, and said steps being repositionable in direction of entrance to allow access to said support grill by an animal.

14. The litter-free pet waste collection system of claim 6, wherein said support grill further comprises apertures at least approximately 0.125 inches in size.

15. The litter-free pet waste collection system of claim 6, wherein said support grill further comprises apertures at least approximately 0.250 inches in size.

* * * * *